007 # United States Patent Office 3,383,172
Patented May 14, 1968

3,383,172
PROCESS FOR PRODUCING SILICA IN THE FORM OF HOLLOW SPHERES
Hanns Biegler, Wesseling, near Cologne, and Gottfried Kallrath, Bruhl-Vochem, Germany, assignor to Deutsche Gold- und Silber-Scheideanstalt vormals Roessler, Frankfurt, Germany
No Drawing. Filed Feb. 4, 1964, Ser. No. 342,525
3 Claims. (Cl. 23—182)

ABSTRACT OF THE DISCLOSURE

Oxides and mixtures of oxides of elements of the IIId and IVth groups of the Periodic Table are formed into spherical and hollow spherical particles by spray drying aqueous suspensions of said oxides containing 20–60% by weight of the oxides at a temperature greater than 200° C.

---

This invention relates to a process for the manufacture of high surface area aggregates of metallic oxides or oxides of metalloids composed of spheres or hollow spherical bodies.

It is well-known, that finely divided, highly dispersed oxides, mixed oxides or mixtures of oxides can be prepared from metals and/or metalloids of the IIId and IVth groups of the Periodic System by the method of precipitation or by pyrogenic decomposition, such as for example, flame hydrolysis or conversion in an electric arc. The products yielded, thus, are finely dispersed and amorphous. They can be utilized for an extremely large number of applications. However, these products could not be obtained, as yet, in the form of stable aggregates consisting of spheres or hollow spherical bodies, although, their application in such a form appeared in many cases highly desirable.

It was found that high surface area aggregates, consisting of spheres or hollow spherical bodies having diameters of about 5 to 500μ, can be obtained from oxides, mixtures of oxides or mixed oxides of the elements of the IIId and IVth groups of the Periodic System by preparing with water a 20 to about 60%, preferably 30%, sprayable suspension of the finely dispersed oxides, mixed oxides or mixtures of oxides, and spray drying the suspension at a temperature greater than 200° C.

The products yielded are composed of aggregates which are stable during storage and transportation.

For the procedure of this invention, all the oxides, mixed oxides or mixtures of oxides of the elements of the IIId and IVth groups of the Periodic System can be utilized as raw materials independently of the method by which they were prepared. Among these are also the oxides obtained by wet precipitation as well as natural products, such as silicates or aluminates, processed by calcination or by alkaline and/or acidic treatment, and, furthermore, oxides obtained by the processing of natural silicic acids, such as the γ-oxides and α-corundum, for example. However, the raw materials preferably used are obtained in the vapor phase by pyrogenic methods, especially by the flame hydrolysis of volatile compounds, such as chlorides and fluorides of the above elements. The best results are obtained, however, by using silicic acid obtained by the conversion of $SiO_2$ with carbon in an electric arc. The elements of the IIId and IVth groups of the Periodic System to be used are aluminum, titanium, zirconium, and particularly, silicon.

As previously explained, a 20 to 60% suspension is used for spray drying. The exact concentration to be used within this range depends in the first place on the thickening effect of the oxides utilized. In any case, the suspension must possess a consistency which is capable of being sprayed. When highly dispersed oxides are used, such as those obtained by flame hydrolysis or in an electric arc, it is most suitable to operate in the upper concentration range. The procedure cannot be used for oxides yielding an aqueous suspension which cannot be sprayed at oxide contents less than 20%.

According to this procedure, the particle size obtainable lies between 5 and 500μ. The particle size can be adjusted and it is kept, preferably, between 100 and 300μ. The particle size can be adjusted by varying the amount—time ratio in the spray drier and by the pressure of the propelling gas. Besides, the particle size-distribution is very steep, and thus, very uniform products can be obtained.

In a rather surprising fashion, the specific surface of the raw-materials remain practically unchanged during the process of this invention. Therefore, it is possible to obtain high surface area products, such as those of 175 m.$^2$/g. (BET), for example. However, it is also possible to decrease the surface area by subsequent tempering of the product at temperatures of 800 to 1200° C.

Finally, it is also possible to apply aftertreatments—heretofore known—to the products, for example such as coating, treatments to achieve hydrophobic property as well as plating with metals and treatments with metallic vapors.

The final water content of the products corresponds to the water content of the materials used.

Due to the spherical and/or hollow spherical form and the high surface, the products are especially suitable adsorptive agents. Because of their spherical shape, the pressure-drop in the system is small, especially during the processing of gases. They can be used in all kinds of adsorption processes. Among these is the processing of gases, vapors, liquids and solutions. Accordingly, they can be used also in the entire field of chromatography. Concerning the field of distribution-chromatography, it is very advantageous that the surface area of the product can be adjusted by tempering to the proper value.

Another advantageous field of application for the products of this invention is their use as catalyst supports, especially as supports for fluid-bed catalysts.

Example I

Silicic acid obtained by conversion in an electric arc, having a bulk density of 89 g./l., a surface area of 175 m.$^2$/g. (BET), and a loss on ignition value of 2.23% (at 1000° C.), is dispersed in water to yield a suspension containing 28% $SiO_2$. The suspension is atomized by means of a presure nozzle at pressures of 15 to 20 atmospheres and dried in a spray drier at temperatures of 280 to 310° C. The hollow spherical bodies, thus produced, are highly resistant to crushing. The particle size-distribution of the product is as follows:

| | Percent |
|---|---|
| >400μ | 0.5 |
| 300–400μ | 9 |
| 200–300μ | 76 |
| 100–200μ | 12.5 |
| <100μ | 2 |

The bulk density of the dried silicic acid is 470 g./l., the residual moisture contents is 0.3%. The BET surface area is 150 m.$^2$/g.

Example II

Silicic acid obtained as described in Example I, having a bulk density of 200 g./l., a surface area of 49 m.$^2$/g., a loss on ignition value of 1.37% (at 1000° C.) is dispersed in water to yield a suspension containing 48% $SiO_2$. The suspension is dried under the conditions described in Example I. The screen analysis of the product is as follows:

| | Percent |
|---|---|
| >400μ | 1 |
| 300–400μ | 1 |
| 200–300μ | 72 |
| 100–200μ | 23 |
| <100μ | 3 |

The characteristic data are as follows:

| | | |
|---|---|---|
| Residual moisture content | percent | 0.2 |
| Bulk density | g./l. | 650 |
| BET surface area | m.²/g. | 45 |

We claim:

1. A method for preparing silica in the form of hollow spheres having a particle size range between about 100 and 300 microns which comprises preparing an aqueous suspension of silicic acid in a concentration of from about 20 to about 60% by weight and spray drying the aqueous suspension at a temperature greater than about 200° C.

2. The process of claim 1 wherein the concentration of silicic acid is about 30%.

3. The method of claim 1 wherein the spray dried hollow spheres are further heated at a temperature of from about 800 to about 1200° C. to reduced the surface area.

| 2,988,521 | 6/1961 | Innes et al. | 252—448 X |
| 3,079,234 | 2/1963 | Jenkins et al. | 23—182 |
| 3,094,384 | 6/1963 | Bertolacini et al. | 23—182 X |
| 3,105,052 | 9/1963 | Haws | 23—139 X |
| 3,120,495 | 2/1964 | Innes | 252—448 |
| 3,161,468 | 12/1964 | Walsh | 252—448 X |
| 3,203,760 | 8/1965 | Winyall | 23—182 |
| 3,243,262 | 3/1966 | Carr et al. | 23—182 |
| 3,273,962 | 9/1966 | Walsh | 23—140 |

OSCAR R. VERTIZ, *Primary Examiner.*

HERBERT T. CARTER, *Examiner.*